United States Patent [19]

Breuner

[11] Patent Number: 5,749,306

[45] Date of Patent: May 12, 1998

[54] PORTABLE, STEERING WHEEL MOUNTABLE, COMPUTER TABLE

[76] Inventor: Erich H. Breuner, 8880 SW. Hillview Ter., Portland, Oreg. 97225

[21] Appl. No.: 757,050

[22] Filed: Nov. 26, 1996

[51] Int. Cl.[6] .................................................. A47B 23/00
[52] U.S. Cl. ........................................ 108/44; 108/135
[58] Field of Search ........................... 108/44, 42, 134, 108/135, 45; 224/276, 277; 248/918

[56] References Cited

U.S. PATENT DOCUMENTS

| | | |
|---|---|---|
| 1,880,621 | 10/1932 | Willetts ............................... 108/42 |
| 4,805,867 | 2/1989 | McAllister . |
| 4,890,559 | 1/1990 | Martin . |
| 4,909,159 | 3/1990 | Gonsoulin . |
| 4,946,120 | 8/1990 | Hatcher . |
| 5,060,581 | 10/1991 | Malinski . |
| 5,177,665 | 1/1993 | Frank et al. . |
| 5,386,785 | 2/1995 | Naor .................................... 108/44 |
| 5,487,521 | 1/1996 | Callahan . |
| 5,628,439 | 5/1997 | O'Hara ............................. 108/44 X |
| 5,653,178 | 8/1997 | Huczka ........................... 108/135 X |
| 5,662,047 | 9/1997 | Metcalf ............................... 108/44 |

FOREIGN PATENT DOCUMENTS

| | | | |
|---|---|---|---|
| 250192 | 10/1966 | Austria ............................... 108/44 |
| 885350 | 11/1971 | Canada ............................... 108/44 |
| 1550899 | 8/1979 | United Kingdom ............... 108/44 |

*Primary Examiner*—Peter M. Cuomo
*Assistant Examiner*—Janet M. Wilkens

[57] ABSTRACT

A table assembly for support of a notebook computer or other material and of the type which may be attached to a vehicle's steering wheel during use. A table structure (28) is pivotally attached to a support structure (26) which is secured to the steering wheel. The Table structure may have separately attached slip stops (12) and control channels (14). The support structure may have separately attached support channels (20), support stabilizer (22), and mounting cord (24). The two structures are connected by pivots (16), and are limited rotationally by the geometry of the mechanical union of these parts.

5 Claims, 6 Drawing Sheets

PORTABLE, STEERING WHEEL MOUNTABLE, COMPUTER TABLE

BACKGROUND

1. Field of Invention

This invention relates to work surfaces to be used in motor vehicles, specifically to such work surfaces for use by a person seated in the driver's seat, when the vehicle is parked.

2. Description of Prior Art

People whose job necessitate performing a significant portion of their work outside of a traditional office often use a motor vehicle as their office. These people typically need to make use of a notebook computer, reference materials, and a writing or eating surface.

A number of devices have been created to provide surfaces, for some or all of these functions, and which when not in use, may be removed from their respective positions of use. None of these devices are designed to adequately solve the variety of concerns of people using a vehicle as a modern office.

U.S. Pat. No. 5,487,521 to Callahan (1996) discloses a steering wheel mounted support for computer, printed matter, food, and/or beverage.

a) The dimensions of this device when stowed substantially limit its portability. This device is both too tall and thick to be conveniently stowed in a vehicle, briefcase, or notebook computer case. This detracts significantly for the person who may use a variety of vehicles when traveling or who can not have clutter in the car while carrying passengers.

b) Also, the design characteristics require a heavy material in order to provide adequate rigidity when extended for computer use. The support ledge does not extend an adequate distance beyond the lower slot to provide sufficient weight distribution and support of the tray. It fails to offer an appropriately rigid work surface without the construction of each being so heavy as to make the overall weight of the assembly unacceptably high.

c) Unless the tray ledge is far shorter than depicted, it will conflict with use of floppy disc or CD drive access on those computers which locate either on their front.

U.S. Pat. No. 5,177,665 to Frank and Jewel (1993) discloses a housing and vehicular support for a portable computer. This design provides a particular means of making peripheral component and power connections, by which its ergonomics are seriously impaired.

d) This device does not take into account the limited distance between the face of a typical vehicle's steering wheel and the torso of the user's body while seated in the driver's seat. The lower housing support shows an electrical cable connection block along the full rear edge of the support. This block necessitates the computer being an inch or so closer to the user's torso in an already limited space. This makes keyboard usage less comfortable and less efficient.

e) The electrical connection bar also seems to require the removal of the peripheral connection access cover from the computer itself in order to allow connection to the cables.

f) Furthermore, this patent illustrates side portions which come all the way to the front edge of the support This feature complicates or eliminates access to the disc drive or the CD drive on many computers where the drive is located on the front half of the side of the computer.

g) This side obstruction, or one in front as with Callahan's, may interfere with the user's wrist when used as a writing surface.

U.S. Pat. No. 5,060,581 to Malinski (1991) discloses a steering wheel tray apparatus for eating or supporting reading material, but fails to adequately support the use of a computer.

h) The support straps of this device interfere with the use of full sized binders, manuals, or books as they tend to fold these materials closed and slide them off the support into the user's lap.

i) Likewise, the ledge near the rear of the tray causes the non-slip feet on the bottom of a computer to lose contact with the tray surface. With no stop at the leading edge of the tray, the computer can slide off toward the user.

j) For notebook computer use, this design is lacking due to the closed back which will not allow for peripheral's cable connections.

U.S. Pat. No. 4,890,559 to Martin (1990) discloses a steering wheel table which provides a horizontally adjustable surface; however, k) this design would not be useful for a computer in a passenger vehicle where the steering wheel face is more vertical than horizontal, and where the top of the wheel is positioned roughly level with a driver's chest. This table pivots from the top of the steering wheel. This feature renders this design inappropriate for the intended use in passenger vehicles.

U.S. Pat. No. 4,805,867 to McAllister (1989) discloses a steering wheel platform of simple design and of limited use. By design, it is longer than the width of a steering wheel, which makes stowage for travel more difficult Also, there is no provision to restrict a computer from sliding off the edge when the platform is used in a sloped position. The stability of this device when attached to a modern passenger vehicle's steering wheel would be insufficient to trust for supporting an expensive computer.

l) A simple bump upward on the bottom could knock the platform and the user's computer off the steering wheel.

U.S. Pat. No. 4,946,120 to Hatcher (1990) and patent 4,909,159 to Gonsoulin (1990) disclose vehicle desks which are used by a person in the driver seat, but with the desk and the user's material in the passenger seat.

m) Both of these designs do nothing to alleviate the awkward twisting the user must make in order to use a computer on the opposite side of the vehicle. Particularly for keyboard usage, this position is unacceptable for comfort or efficient operation.

n) This position requires the user to extend their arms a differential distance to the keyboard. Typing or even data entry at this angle is very unnatural and difficult.

OBJECTS AND ADVANTAGES

Accordingly, besides the objects and advantages of the portable, steering wheel mountable, computer table described in my patent, several objects and advantages of the present invention are to provide an assembly which:

a) may be folded flat with minimized dimensions to facilitate stowage in a computer case, briefcase, seat back pocket, or similar limited space for travel and to reduce vehicle clutter;

b) is adequately rigid so as to be a stable platform while being of light weight so as to maximize portability;

c) minimizes obstructions to the front of a computer and to the use of its disc drives;

d) is comfortable and efficient to use by making best use of the limited distance between the sloped plane of the vehicle steering wheel and the torso of the user;

e) does not require any modification or removal of any cover from a portable computer in order to utilize the table;

f) minimizes obstructions to the side of a computer and to the use of its disc drives;

g) minimizes obstructions on its front or either side which may interfere with a user's wrist when using the table as a writing surface;

h) has low profile side supports to allow printed matter to lay relatively flat;

i) incorporates a stop or stops to inhibit the computer or other items from sliding off the surface when it is being used at an angel below the horizontal;

j) is open behind the computer so that cable connections may be made through the steering wheel and table support, without having to move the computer closer to the user's torso;

k) is designed primarily for use in passenger vehicles where the steering wheel plane is normally variable between approximately 60 and 80 degrees above horizontal;

l) remains well mounted and supportive if it is bumped or jostled without letting the computer fall;

m) minimizes any need for the user to twist their torso in order to reach the surface; and n) is used directly in front of the user allowing equal arm extension to reach a computer keyboard.

Further objects and advantages are: 1) to provide a work surface which utilizes a vehicle's adjustable angle steering column to optimize the user's comfort for table slope angle, 2) to allow for shock movement, thus protecting from its failure to support a computer or other material. This invention provides a table which can be readily mounted and removed from the steering wheel and which offers efficient computer use by unobstructed and ergonomic design. Still further objects and advantages will become apparent from a consideration of the ensuing description and drawings.

DRAWING FIGURES

In the drawings, closely related figures have the same number but different alphabetic suffixes.

| Reference Numerals In Drawings | |
| --- | --- |
| 10 table surface | 12 slip stops |
| 14 control channels | 16 pivots |
| 18 supports | 20 support channels |
| 22 support stabilizer | 24 mounting cord |
| 26 support structure (SS) | 28 table structure (TS) |
| 30 steering wheel (SW) | 32 notebook computer (NC) |

Figure 1A:
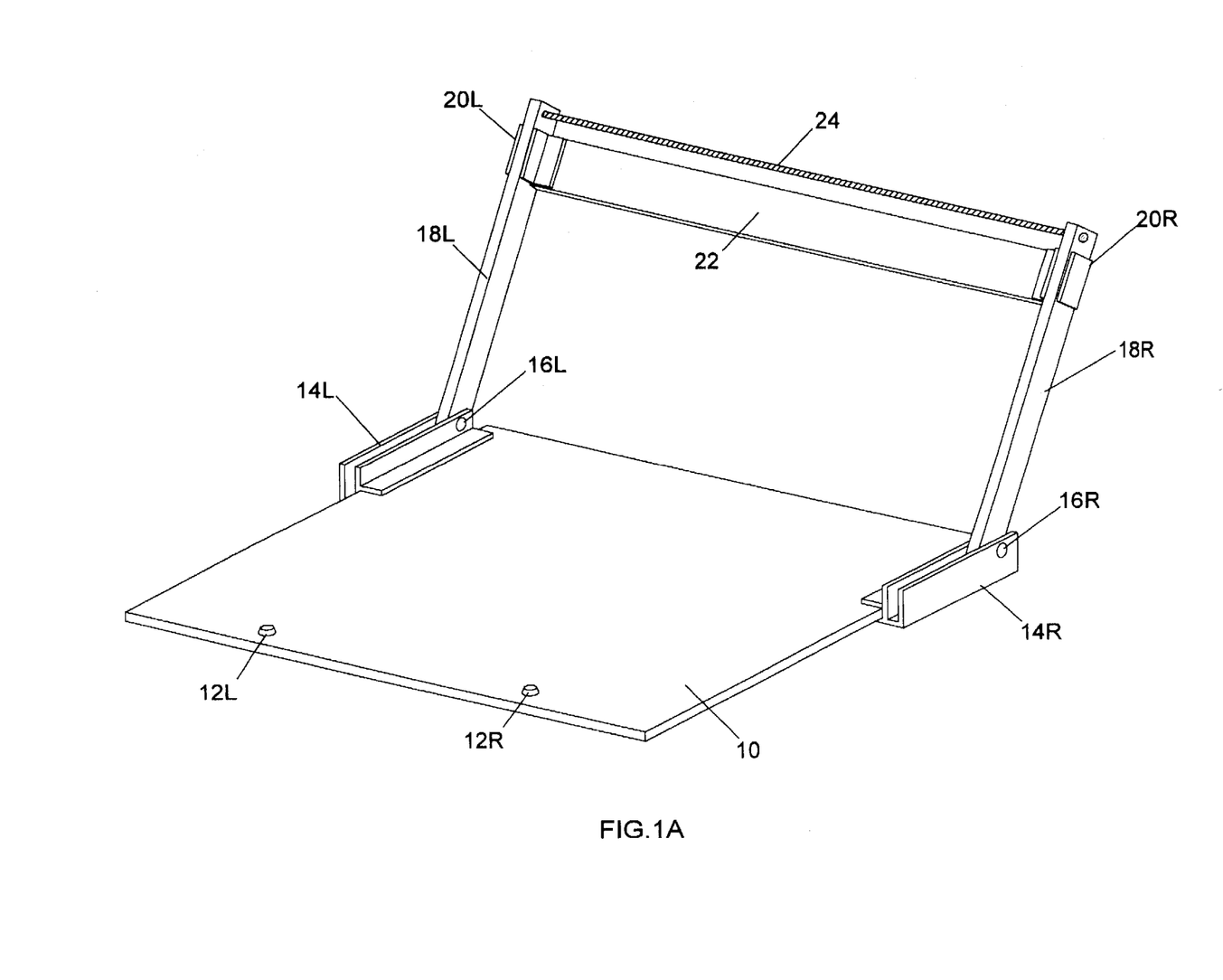
FIG. 1A shows a support table in perspective view assembled of the various parts of a typical embodiment.
Figure 1B:
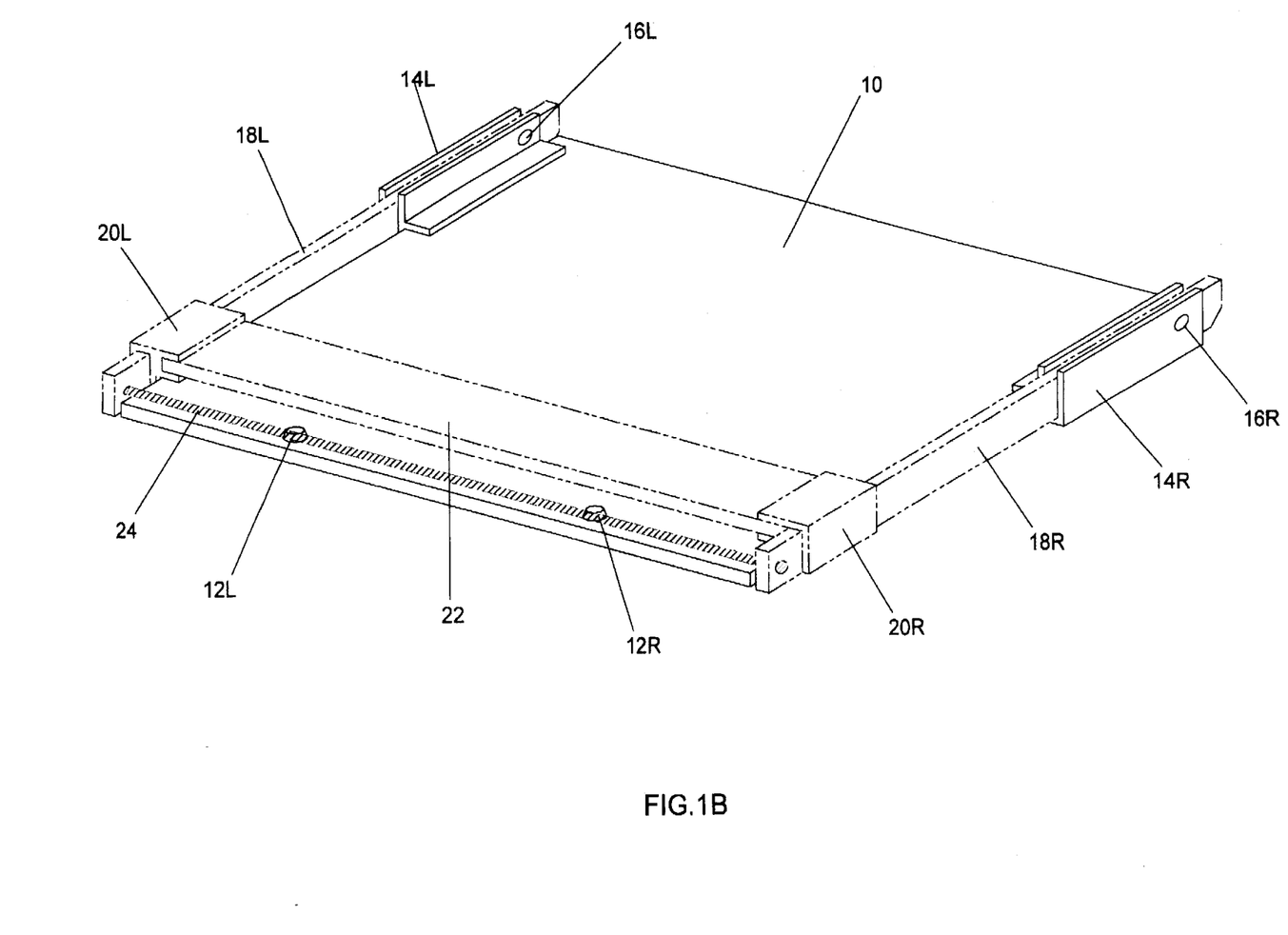
FIG. 1B shows a support table in perspective view in the closed position as when not in use.
Figure 1C:
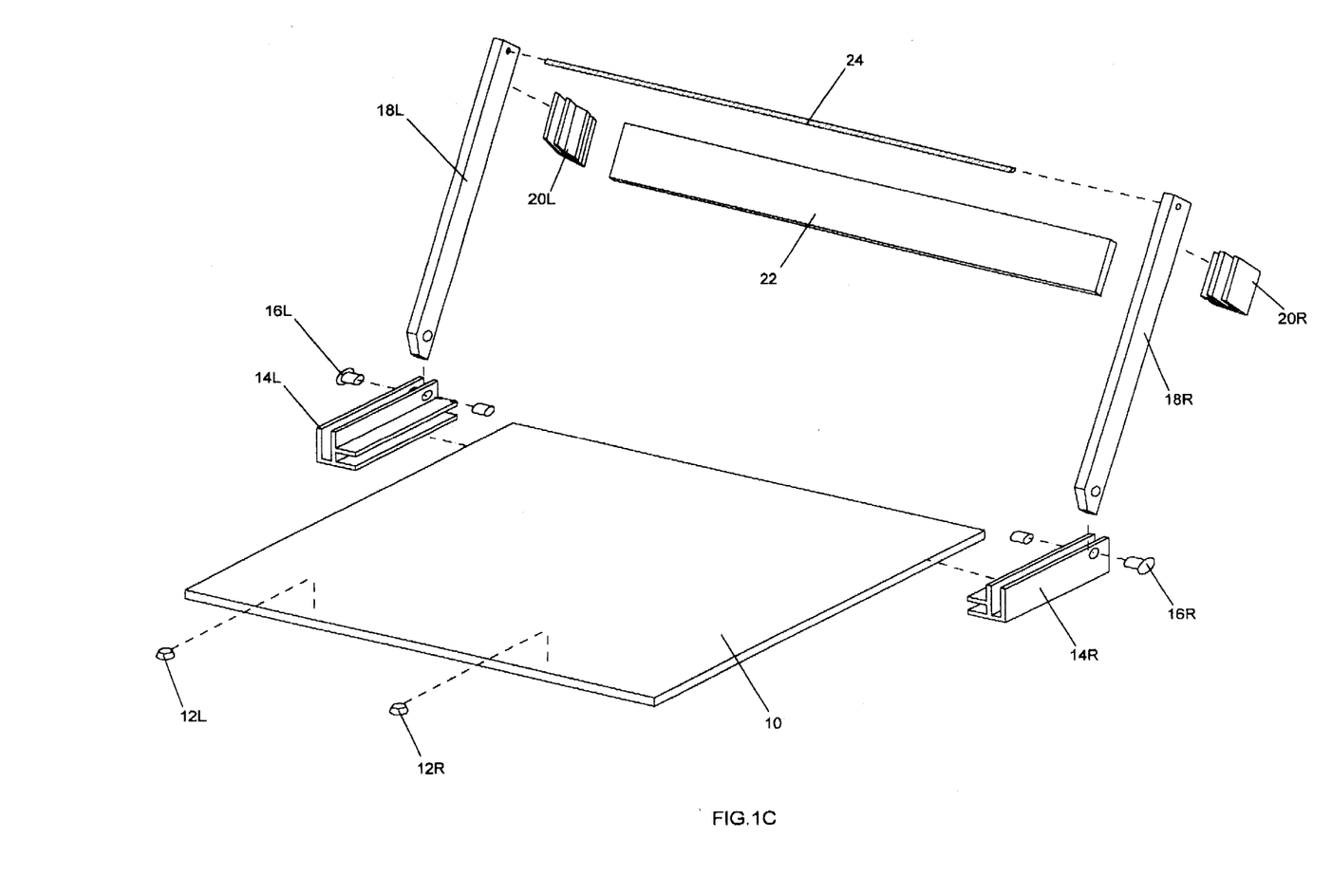
FIG. 1C shows a support table in perspective exploded view and the association of the various parts.
Figure 1D:
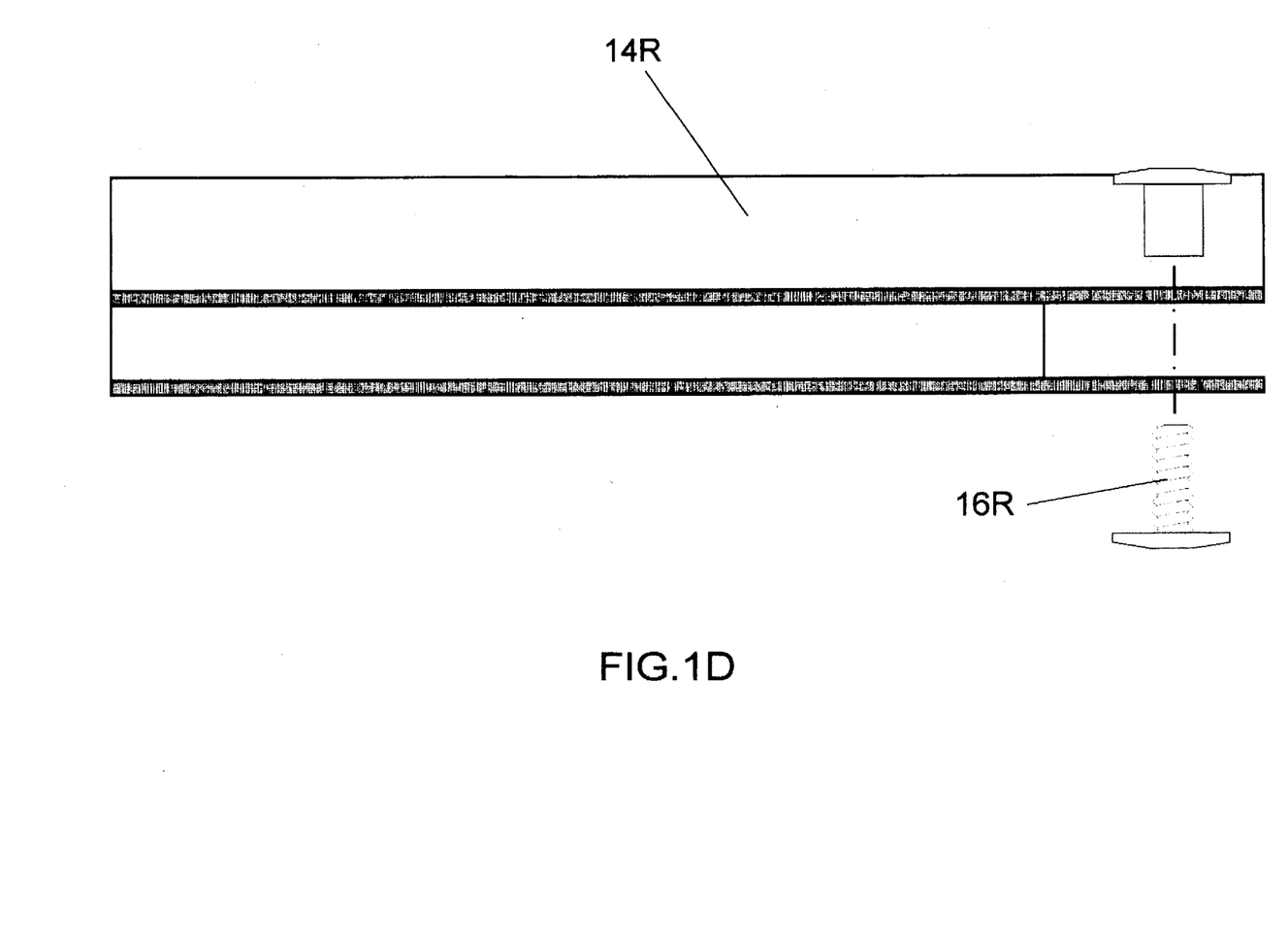
FIG. 1D shows a control channel with a notch to limit angular orientation in association with a pivot.
Figure 2:
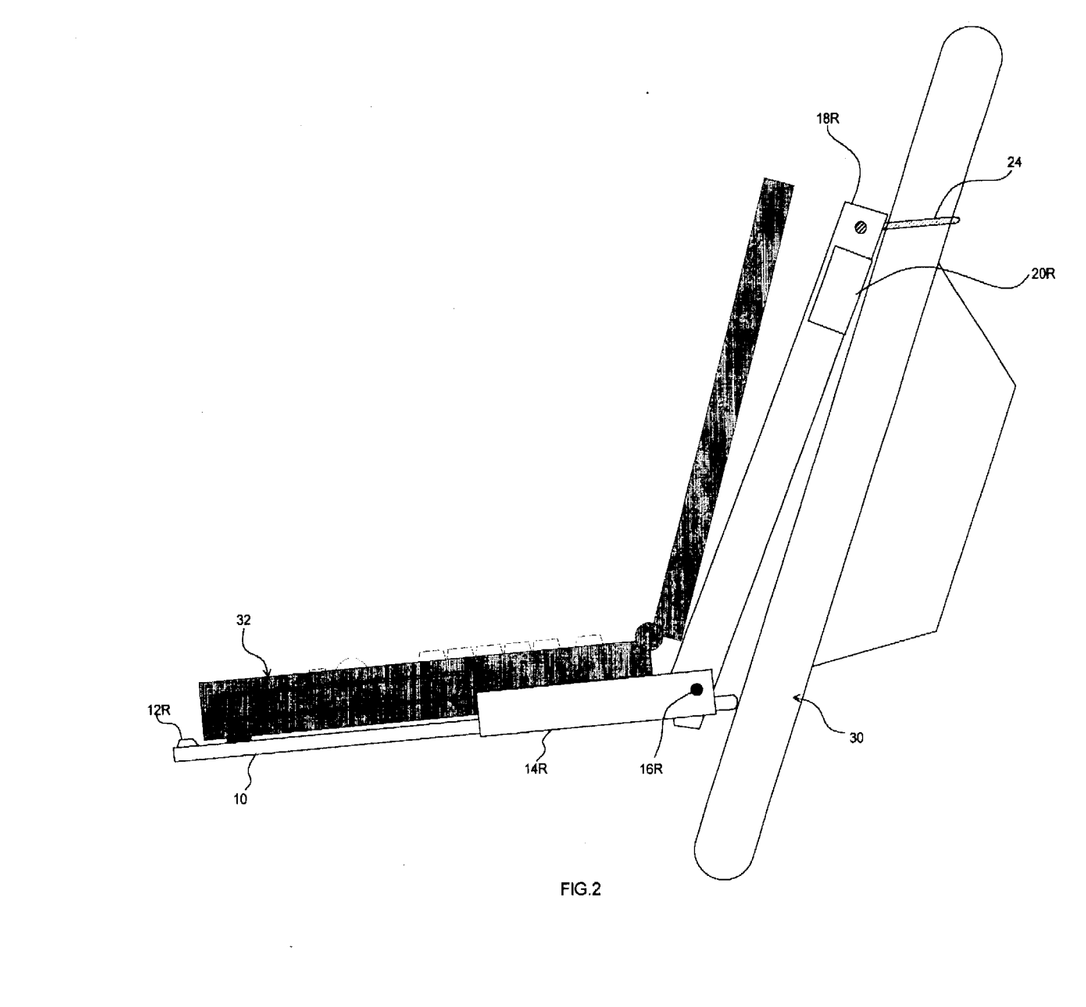
FIG. 2 shows a support table in right side view as it would be associated with a steering wheel when mounted and with a computer in place for use.
Figure 3:
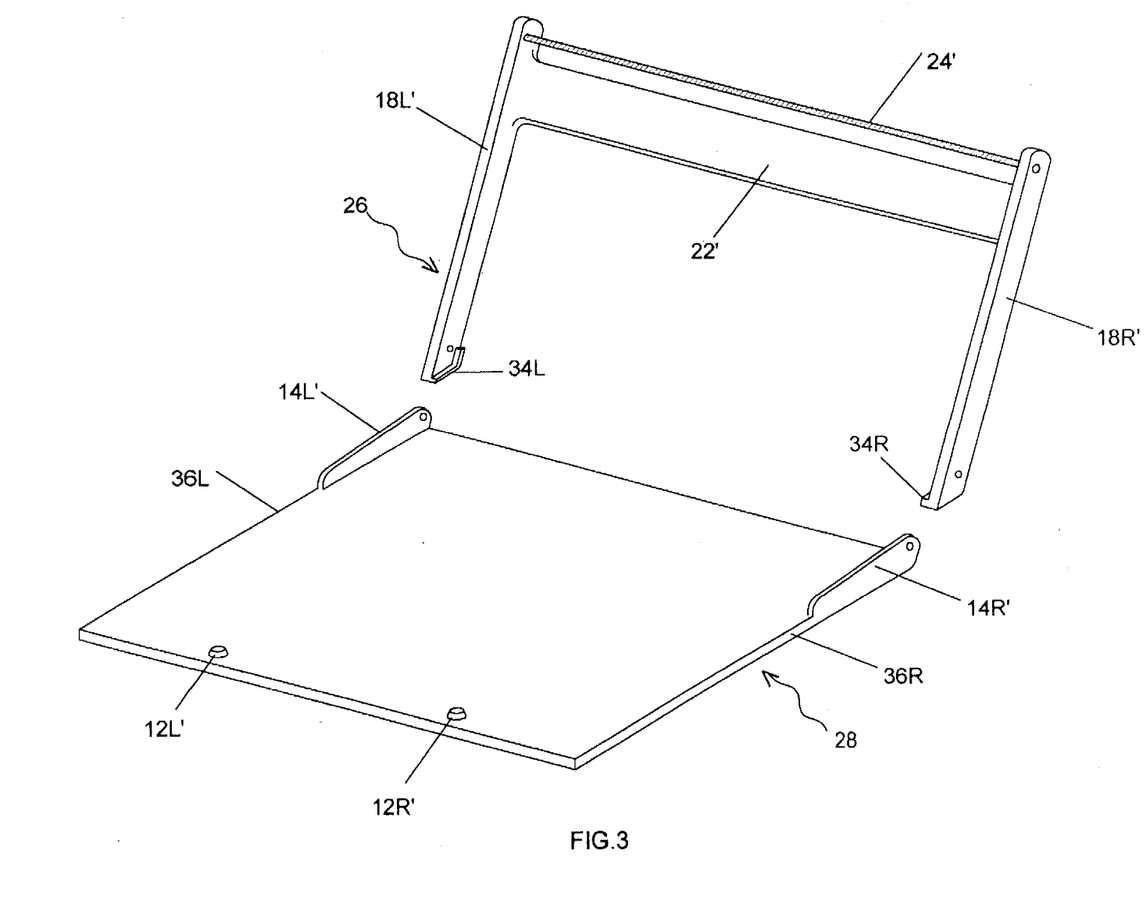
FIG. 3 shows an embodiment where the major components are of molded, thermoformed, or pressed fiber board or resin construction.

DESCRIPTION—FIGS. 1 to 3

A typical embodiment of the table of the present invention is illustrated in FIG. 1A (perspective open view), FIG. 1B (perspective closed view), and FIG. 1C (perspective exploded view). FIGS. 1A and 1C are each in the open position, ready for use. FIG. 1B shows the table in the closed position, ready for stowage. The table has a table surface 10 of uniform cross section consisting of a lightweight rigid sheet of material. It has a flat top surface, and four sides and bottom which may be flat or other profile. In this embodiment, a 6 mm sheet of aerated polyvinyl chloride (PVC) is used, which may be readily found at plastics suppliers. However, this surface can consist of another material which is lightweight and adequately rigid, and may be of homogeneous, laminated, latticed, or other structural cross section.

On top of the table surface, near the front edge, are slip stops 12L (left) and 12R (right). In a typical embodiment, two separate pieces are used which are a bump shaped rubber bumper with a flat, self-adhesive base by which it will adhere to the table surface. Alternatively, this may be one piece of an elongated material, but still having a low profile so as not to obstruct computer use or the users hand or wrist if writing.

Attached to each side at the rear portion of the table surface are control channels 14L (left) and 14R (right). At the rear of the control channels, and in the section in which the channel opening is upward, there is a notch cut out of the bottom. The control channels may be of varying design and/or material as long as the combination of these with the table surface result in an acceptably rigid and stable surface and support assembly. In a typical embodiment, this is an aluminum extrusion which may be ordered at window installation supplies distributors.

Pivots 16L (left) and 16R (right) connect the control channels to supports 18L (left) and 18R (right) through holes in each of these members. The pivots may be comprised of binder bolts, rivets, or other similar means. In this embodiment, the supports are of the same material as the table surface. Their length is similar to the depth of the table surface. Their width is such that they rest flush within the control channels when the device is in the closed position. At the bottom of the front edge of the supports, the corner is cut off at a precise angle. This angular cut at the bottom of the support is rotated into a geometrically predetermined position against the end of the notch in the bottom of the control channel. A type of hinge device may be use in lieu of the pivots and the control channels to provide the pivotal connection between the supports and the table surface.

The supports are joined to each other through connections with support channels 20L (left) and 20R (right) and a support stabilizer 22. Near the opposite end of the supports from the pivots is attached a mounting cord 24. The mounting cord in these embodiments consists of a length of shock cord, which is attached to both supports in a partially stretched state. Alternatively, the mounting cord may also consist of a length of rope or metal rod.

FIG. 1D shows a top view of control channel 14R with pivot 16R. Pivot is shown exploded in two parts and in alignment with the holes in the control channel through which they secure in place. This figure is oriented to show a notch in the control channel, which limits angular orientation of a support 18R with the control channel, in association with the pivot.

FIG. 2 shows the table in a right sew as it would be mounted on a steering wheel 30 with a notebook computer 32 resting on the table surface. The mounting cord is shown in this view stretched around the top of the steering wheel as it is used to attach the table.

FIG. 3 illustrates a perspective view embodiment where the two major components are of molded, thermoformed, metal, or formed fiber and resin construction. In this embodiment, the combined functions of the support, the support channels, the support stabilizer, and the mounting cord are referred to as a support structure 26; although, the mounting cord is not typically of the same material as the rest. The support structure includes two side supports 18L' and 184', a support stabilizer 22' and a mounting cord 24'. At the lower, inside portion of each side support is a support angle flange 34L and 34R that is functionally equivalent to the angular cut previously described at the lower portion of each support.

The other major component in this embodiment is referred to as a table structure 28 which combines the functional characteristics of the table surface, the control channels, the pivot and the slip stops 12L' and 12R'. The slip stops may be of different material and adhered to the table's surface, or of the same material integrally formed with the rest of the table structure.

Particularly with a molded table structure, it may be of various cross sections, as long as the top side is a planar surface. To reduce the weight and amount of material used, a grid or web design on the under side may be used which will still maintain the structure's rigidity.

These two structures may be joined by binder bolts, rivets, or other means, including a peg which may be integrally molded as part of the table structure or the support structure.

OPERATION—FIGS. 1–3

FIGS. 1A–1C illustrate perspective views of an embodiment showing the same parts, but in different orientation. The table surface is the primary component of this invention. The table surface is put into a usable position, after the device is mounted on a vehicle's steering wheel, by simply opening the table. That is, by rotating the table surface into position as indicated in FIGS. 1A and 2, from the closed position, as in FIG. 1B. It is intended for use at a comfortable angle, sloping downward towards the user's body, typically between 0 and 10 degrees. The angle between the table surface and the support when the device is in the open position is fixed, but may be constructed with detents or other means of adjusting this angle. In the embodiments shown, the angle is intended to be adjusted for personal comfort through the use of the vehicle's adjustable angle steering wheel as most modern vehicles are now equipped. In the open position, it provides a clear space on which to place and efficiently use a notebook computer, reference material, paper pads, or forms, as well as a surface to place food.

As stated, the table surface is opened to a fixed angle in this embodiment This angle is determined by the connection at the pivot of the control channels and the supports. The angular face at the bottom of the support is designed to contact, and stop at the base of the notch in the bottom rear of the control channel These element s are rotated into position about the horizontal axis formed by the two pivots. When closed, the table surface is rotated about these pivots to a point where the table surface stops against the support stabilizer and between the supports as shown in FIG. 1B.

The mounting cord in these designs consists of shock cord so that is stays neat and untangled when not in use. It also provides sufficient strength to support the entire device as well as a computer or other matter up to about ten pounds, and the nominal weight applied by the user's hands as they type, write, or eat. The mounting cord is stretched over the top, around the back of a vehicle's steering wheel and the table is pulled down to a point where the supports and mounting cord are snug on the steering wheel. In this position, the mounting cord's elasticity keeps the table securely mounted and supportive if it is bumped or jostled in use.

The support stabilizer and support channels function to maintain a constant distance between the supports and to maintain the table on the steering wheel in a horizontal and fixed mounted position.

This complete design, by its placement directly in front of the user, eliminates any need of the user to twist their body toward the passenger seat to reach their work. This placement also allows the user an equal arm extension to the computer keyboard or other material as they would normally position themselves at a traditional desk or table.

The embodiment shown in FIG. 3 operates the same as the embodiment in the previous figures. The functional differences are due to the combination of the table surface, the control channels (which are just flanges 14L' and 14R', in this embodiment), and the slip stops, which collectively are referred to as the table structure. Also, the combination of the supports with the support channels, support stabilizer, and the mounting cord, are referred to collectively as the support structure. The table structure angle, when open, is limited by the physical contact of the flange at the bottom of each side of the support structure with the back of the control channel (flange) on the table structure as well as the bottom edges of the table structure.

SUMMARY, RAMIFICATION, AND SCOPE

Thus the reader will see that the table of the invention provides a lightweight, compact, yet substantial computer or work support which is portable and useful in most modern passenger vehicles.

While my above description contains many specifications, these should not be construed as limitations on the scope of the invention, but rather as an exemplification of some of the preferred embodiments thereof. Many other variations are possible. For example, all the edges and corners of the components may be rounded or chamfered. The construction materials may be mixed or different altogether, or the shape of the channels, flanges, or other components may be modified. The color or texture of all pieces may be varied for visual appeal or to provide a non-skid table surface.

Accordingly, the scope of the invention should be determined not by the embodiments illustrated, but by the appended claims and their legal equivalents, rather than by the examples given.

I claim:

1. A portable steering wheel table for use in a vehicle, comprising:

a planar table surface;

a pair of control channels attached to opposite sides of the table surface; and a pair of supports, each connected to a respective one of said control channels by pivots, the pivots allowing the table surface to rotate with respect to the supports from an open position wherein the table surface extends at an angle from the supports to a closed position wherein the table surface lies adjacent the supports and the supports rest flush with the control channels.

2. A portable steering wheel table for use in a vehicle, comprising:

a planar table surface;

a pair of channels or flanges attached to opposite sides of the table surface; and a pair of supports, each connected to a respective one of said control channels or flanges by pivots, the pivots allowing the table surface to rotate with respect to the supports from an open position wherein the table surface extends at an angle from the supports to a closed position wherein the table surface lies adjacent the supports and the supports rest flush with the control channels or flanges.

3. A steering wheel table for use in a vehicle, comprising:

(a) a planar table surface having opposite table side edges, each said table side edge having a control flange; and (b) a table support with pivotal connection to said table surface, said table support comprising:

(i) two side supports, each side support having a support angle flange at a lower, inner portion thereof;

(ii) a rigid support stabilizer having two remote ends, one of said two side supports at each of said two remote ends of said support stabilizer; and (iii) a flexible mounting member having two remote ends, one of said two side supports at each of said two remote ends of said flexible mounting member;

(c) wherein said opposite table side edges are each supported by the respective control flange therewith said support angle flange limiting said pivotal connection between said table surface and said table support.

4. The steering wheel table of claim 3 wherein said steering wheel table is supported on a steering wheel by said flexible mounting member.

5. The steering wheel table of claim 3, said steering wheel table having an open position wherein said table surface is supported at an angle to said table support, said angle defined by said support angle flange, and a closed position wherein said table surface lies adjacent said side supports.

* * * * *